United States Patent [19]

Guzman et al.

[11] Patent Number: 5,439,692
[45] Date of Patent: Aug. 8, 1995

[54] PROCESS FOR INFUSING RAISINS WITH HUMECTANT

[75] Inventors: Miguel Guzman, Santa Cruz; George Sousa, Jr., San Jose, both of Calif.

[73] Assignee: Kellogg Company, Battle Creek, Mich.

[21] Appl. No.: 309,785

[22] Filed: Sep. 21, 1994

Related U.S. Application Data

[63] Continuation of Ser. No. 53,731, Apr. 27, 1993, abandoned.

[51] Int. Cl.$^6$ .......................... A23L 1/212; A23B 4/10
[52] U.S. Cl. .................................... 426/321; 426/102; 426/293; 426/302; 426/304; 426/506; 426/519; 426/640
[58] Field of Search ............... 426/102, 293, 302, 304, 426/506, 519, 640, 321

[56] References Cited

U.S. PATENT DOCUMENTS

| | | | |
|---|---|---|---|
| 3,952,112 | 4/1976 | Fulger et al. | 426/321 |
| 4,103,035 | 7/1978 | Fulger et al. | 426/321 |
| 4,364,968 | 12/1982 | Waitman et al. | 426/639 |
| 4,696,824 | 9/1987 | Meczkowski et al. | 426/102 |
| 4,775,545 | 10/1988 | Augustine et al. | 426/639 |
| 4,917,910 | 4/1990 | Hsieh et al. | 426/102 |
| 4,961,943 | 10/1990 | Blanthorn et al. | 426/102 |
| 5,000,971 | 3/1991 | Hsieh et al. | 426/302 |
| 5,073,400 | 12/1991 | Bruno et al. | 426/639 |
| 5,286,505 | 2/1994 | Hartsun et al. | 426/102 |

FOREIGN PATENT DOCUMENTS 1483805  8/1977  United Kingdom .

OTHER PUBLICATIONS

Dean Duxbury, Food Processing, May 1993, pp. 55–56.

*Primary Examiner*—Helen Pratt
*Attorney, Agent, or Firm*—Felfe & Lynch

[57] ABSTRACT

Softness retention characteristics of raisins are improved by applying to the surface of the raisins a pure edible polyalcohol humectant, preferably glycerol, at a rate of 20–28% based on the weight of the raisins. The humectant is then infused into the raisins under vacuum conditions with occasional tumbling for a time efficient to enable the raisins to absorb the humectant to an amount of about 10–19% by weight. The raisins are then removed from the humectant solution and thereafter dried to a moisture content of 7–20%.

25 Claims, No Drawings

PROCESS FOR INFUSING RAISINS WITH HUMECTANT

This application is a continuation of application Ser. No. 08/053,731, filed Apr. 17, 1993, now abandoned.

FIELD OF THE INVENTION

This invention relates to methods for attaining and preserving the softness of dried fruits to be stored in isolation or in combination with other food products such as cake mixes and similar flour-based products and, in particular, dry ready-to-eat cereal breakfast foods. More particularly, this invention relates to methods for infusing relatively large amount of humectants, particularly glycerol, into raisins intended to be formulated in combination with dry read-to-eat breakfast foods.

BACKGROUND OF THE INVENTION

Fresh raisins and other dried fruits, even when sealed in waxed paper and foil within paperboard containers, progressively lose their softness and become hard, presumably because of moisture losses and chemical changes. The loss of softness or tenderness becomes more pronounced when the raisins are packed with dry food products, such as toasted bran or corn flakes, which have a low moisture content relative to the raisins. In order to prevent rapid loss of moisture from the raisins to the cereal, it previously has been necessary to increase the moisture content of the cereal prior to packaging with raisins. The addition of moisture to the cereal, however, causes a substantial loss of crispness, which is undesirable in many such products.

An alternative method of keeping raisins soft is to employ an edible humectant, such as glycerol. However, the simple topical application of a humectant to a dried fruit, such as raisins, having a relatively tough outer skin does not reliably increase the softness retention characteristics of the fruit under storage conditions, and the fruit will absorb only small amounts of the humectant through the skin. Moreover, any improvement in softness retention resulting from the initial incorporation of a high level of moisture into the fruit is quickly lost during conventional storage.

There are various known methods for the treatment of raisins and other dried fruits which involve infusion of edible humectants into said fruits. These methods suffer from one or more disadvantages, including the necessity of a pretreatment step using acids, alkalis, surfactants, and similar additives which necessitate one or more specific removal steps. In other methods of infusion, the total amount of humectant which can possibly be added to raisins is generally below 10% by weight. Still other methods permit the infusion of higher levels of humectant but these methods generally suffer lack of uniformity—i.e. humectant levels vary in an unsatisfactorily broad degree—or the methods call for a process which requires two or three days, or more, for completion.

U.S. Pat. No. 4,696,824 discloses a process of coating a surface of raisins with glycerol and oil in order to improve their bulk handling and bulk transportation characteristics. The surface treatment of raisins with humectant, such as glycerol, has long been known but, as noted above, surface treatment alone does not prevent the undesirable drying out of raisins when packaged with dry products such as ready-to-eat cereals.

U.S. Pat. Nos. 3,952,112 and 4,103,035 teach methods of treating raisins with glycerol (and other polyalcohol humectants) by a process involving immersion and soaking of the raisins in glycerol or a glycerol-containing solution for a period of about 24 hours. Pretreatment of the raisins is ordinarily required. U.S. Pat. No. 3,952,112 teaches various pretreatment steps which enhance the ability of the raisins to absorb the glycerol during the soaking process. Such pretreatment steps include soaking the raisins in water, application of a vacuum, treating with small amounts of a surface active agent or a weak alkali, etc. In U.S. Pat. No. 4,103,035 the suggested pretreatment steps include soaking in water and treatment with an acidulating agent. By means of the processes taught in these patents, and with proper choice of reaction times and conditions, it has been possible to attain high levels of glycerol in raisins. However, under industrial conditions, the glycerol content of the raisins has varied considerably. The result is that not all of the raisins attained the desired high levels of glycerol infusion and therefore, when packaged with dry cereals, some of these dried out to an unsatisfactory degree.

U.S. Pat. Nos. 4,917,910 and 5,000,971 disclose a method of infusing high levels of glycerol into raisins by means of an initial step involving the spraying of glycerol onto a tumbling bed of raisins. It appears, however, that in order to attain a high level of glycerol infusion the raisins have to then be maintained in a static condition for a period of time of about four weeks.

Co-assigned U.S. patent application No. 07/917,834 discloses a process for infusing humectant into raisins under conditions which reduce the period of processing time to about 24 hours. The process involves a tempering step in which the raisins are maintained in a specified temperature range. However, it would still be desirable to develop a process in which humectant infusion can be done in a shorter period.

It is the principal object of this invention to provide an improved process for infusing high levels of glycerol into raisins by a method which does not require substantially more than about six hours of processing time and results in a product having a substantially uniform level of glycerol infusion.

SUMMARY OF THE INVENTION

Raisins treated to have a moisture content of about 20 to 24% are sprayed with pure glycerol in sufficient amount to provide a glycerol content from about 18 to about 28 percent based on the weight of the raisins. The glycerol-treated raisins are then subjected to an infusion step under a vacuum which involves reducing the pressure above the raisins and maintaining the raisins, preferably with occasional tumbling, for sufficient time to permit the absorption of about 10 to 19% by weight of glycerol into the raisins. It has been found that this level of absorption is generally attained in about six hours. The raisins are then separated from any unabsorbed glycerol. The glycerol-infused raisins are thereafter dried to a moisture content of from about 11 to about 15%.

DETAILED DISCLOSURE

The process of this invention represents an improvement over processes disclosed in U.S. Pat. Nos. 3,952,112 and 4,103,035. The improved process does not involve the use of acids, alkalis or surfactants, all of which would have to be carefully washed away. This invention provides a method for attaining raisins with a uniformly high level of humectant in a process requiring no more than about six hours.

The raisins usable in this process should have a moisture content of from about 20 to 24%. Typically, commercially available untreated raisins will have a moisture content of from about 11 to 14% and it will therefore be necessary in most cases to rehydrate the raisins to the desired moisture content level. The rehydration step consists essentially of immersing the raisins in a hot water bath at a temperature of from about 170° F. (76° C.) to about 180° F. (83° C.) for a period of 60 to 90 seconds. In addition to increasing the moisture content of the desired level, this rehydration step also acts to remove natural waxes from the surface of the raisins and to open pores.

The humectants usable in the process of this invention are the usual humectants used in the processing of dried fruits. They include the edible polyalcohols such as glycerol, sorbitol, propylene glycol, mannitol and others, as well as mixtures thereof. The most generally used humectants are glycerol alone or glycerol admixed with sorbitol. The details of this invention will generally be discussed in terms of glycerol as the humectant, but it should be understood that the invention is equally applicable to other known polyalcohol humectants and to mixtures thereof with glycerol, such as, for example glycerol and sorbitol.

Raisins having the desired moisture content of 20 to 24% are sprayed with pure glycerol at a temperature of from about 150° F. (65° C.) to 190° F. (88° C.), the amount of glycerol ranging from about 20 to about 28% by weight of the raisins. Preferably, the spraying temperature is from 170° F. (76° C.) to 180° F. (82° C.) and the glycerol content should be between 22 and 26 weight percent. This spraying step should be done in such a way as to ensure that the glycerol is sprayed on the entire surface of the raisins and, for this purpose, a multi-jet spray mechanism is normally employed. Conveniently, the spraying step is performed in a stainless steel tumbler provided with means for drawing a vacuum.

Since only a portion of the sprayed glycerol will be absorbed into the raisins, the result of the spraying process will be mostly a mixture of glycerol and raisins coated with glycerol. Therefore, it is necessary to provide an infusion step in order to cause the raisins to absorb sufficient amount of glycerol. The infusion step is performed over a period of from about 5 to 8 hours, preferably about six hours, in a tumbler vessel equipped with a vacuum pump. The temperature in the tumbler vessel should range from about 90° F. (32° C.) to about 110° F. (44° C.). It is highly desirable, during the infusion step, to tumble the raisins for period of from about two to five minutes in order to create a good dispersion of glycerol around the surface of the raisins. The raisins should be tumbled for a period of about two to five minutes preferably about three minutes, at the beginning of the infusion step. Preferably, there are additional tumbling periods of about three minutes during the infusion step. Most conveniently, a second tumbling of about two to five minutes, preferably about three minutes, occurs at about the mid-point of the infusion step. Thus, assuming an infusion period of six hours, there will be two tumbling periods, the first occurring during the first three minutes of the infusion step and the second occurring during about three hours.

After the infusion, the raisins and any unabsorbed glycerol are separated. The raisins are then rinsed with water and passed to a drying stage. The unused glycerol can be recycled. The raisins removed from the infusion vessel have a glycerol content of from about 10% to about 19%, more likely from 12 to 16.5%. After rinsing, the raisins have a moisture content of about 20 to 24%. The raisins are then subjected to a drying step in order to attain a final moisture content of from about 11 to about 15%. The drying step takes place at a temperature between 130° F. (54° C.) and 180° F. (83° C.), typically at a temperature of about 140° F. (60° C.), and requires a period of about 60 to 90 minutes. Conveniently, the drying can be accomplished in three stages, the first stage having a temperature of about 170° F. (77° C.), the second stage a temperature of 140° F. (60° C.) and the third stage a temperature of abut 70° F. (21° C.).

As further process steps, the raisins can be sprayed with edible vegetable oil in an amount of from about 0.5 to about 1% and then, if desired, coated with sugar.

This invention will be better understood by reference to the following example, which is included here for illustrative purposes only and is not to be construed as a limitation.

EXAMPLE

Raw raisins with a moisture content of about 11 to 14% were dumped into a hopper containing a stirring/breaking mechanism which breaks up any agglomerated lumps. From the hopper, the raisins were then placed into a conveyor system which feeds the raisins into a rehydration tank containing water maintained at a temperature of about 175° F. (79° C.). The raisins stayed in this water bath for a period of about one to two minutes and emerged from said bath with a moisture content of about 20 to 24%. These rehydrated warm raisins were then loaded into a temperature controlled stainless steel tumbler. The temperature is maintained at about 100° F. (38° C.). Hot glycerol at a temperature of 160° to 175° F. (71°–77° C.) was sprayed on the hot raisins, the amount of glycerol being controlled so that about 18 to 22 pounds of glycerol were sprayed per 100 pounds (approximately 11 to 13 kg per approximately 50 kg) of raisins. The tumbler door was then closed and the vacuum pump activated. When the vacuum reached approximately 35 mm of Hg, the mixture was allowed to tumble for approximately three minutes in order to attain a good dispersion of glycerol on the surface of the raisins. After three hours of exposure time, the vessel was again tumbled for three minutes. After the second tumbling, the raisins were retained in the vessel for an addition three hours. After a total infusion time of six hours, the content of the vessel—i.e., raisins with glycerol absorbed and unabsorbed glycerol—were dumped into a shaker pan and the raisins and the glycerol were separated.

The raisins were rinsed with fresh water and oven dried in a three-stage dryer. The first stage had a temperature of 170° F. (77° C.); the second stage has a temperature of 140° F.; and the third stage had a temperature of 70° F. (21° C.). The entire drying process required about 90 minutes. The raisins emerging from the dryer have a glycerol content of from 12 to 16.5% and a moisture content of from 11 to 14%.

The foregoing examples teach a method for improving softness retention of raisins, although the artisan of ordinary skill with note that the method is equally applicable to other dried fruits, such as prunes, apricots, and so forth. Such fruits are useful in cereal compositions as well as in other contexts, and the invention will be seen to embrace treatment of all such fruits.

As noted, when the dried fruit, e.g., raisins, are treated, they should contain anywhere from about 18 to about 26% moisture. In some, though not all cases, this will require pretreatment of the dried fruit via, e.g., soaking it in hot water for a short period of time. Other methods for treating the dried fruit to contain the requisite moisture content will also be known to the skilled artisan, and need not be repeated here.

The pure edible polyalcohol humectant applied to the dried fruit may be, e.g., glycerol (glycerine), sorbitol, propylene glycol, mannitol, etcetera. Any and all combinations of more than one polyalcohol can also be used. The amount applied to dried fruit may vary, and preferably it ranges from about 18% to about 28% of the dried fruit, applications of 20–28% being particularly preferred.

Other aspects of the invention will be clear to the skilled artisan, and need not be repeated here.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

We claim:

1. A method for improving softness retention characteristics of raisins which comprises the steps of
   (1) providing raisins with a moisture content of from about 18 to about 26%;
   (2) applying to the surface of said raisins pure edible polyalcohol humectant at a temperature of from about 150° F. to 190° F. in an amount of from about 18 to about 28 percent based on the weight of the raisins;
   (3) infusing the raisins with the humectant by reducing the pressure above the raisins and maintaining said raisins under conditions at reduced pressure for a period of from about 5 to about 8 hours to enable the raisins to absorb said humectant to an amount of from about 10% to about 19% by weight;
   (4) tumbling said raisins;
   (5) separating the raisins from any unused humectant; and
   (6) thereafter drying the raisins to a moisture content of from about 7% to about 20%.

2. A method according to claim 1 in which the edible polyalcohol humectant is selected from the group consisting of glycerol, sorbitol, propylene glycol, mannitol and mixtures thereof.

3. A method according to claim 1 in which the edible polyalcohol humectant is glycerol or a mixture of glycerol and sorbitol.

4. A method according to claim 3 in which the edible polyalcohol humectant is glycerol.

5. A method according to claim 3 in which the raisins are first hydrated with water at a temperature of from 100° to 190° F. or for sufficient time to attain the moisture content of from about 18 to 26%.

6. A method according to claim 5 in which the raisins are hydrated at a temperature of from 170° to 180° F. to attain a moisture content of from 20 to 24%.

7. A method according to claim 5 in which the hydration time is from about 60 seconds to about 90 seconds.

8. A method according to claim 3 in which humectant at a temperature of 160° to 180° F. is applied to the surface of the raisins by spraying.

9. A method according to claim 8 wherein the amount of humectant applied is from 20 to 24% based on the weight of the raisins.

10. A method according to claim 3 wherein the raisins are dried to a moisture content of from about 11 to about 15 weight percent.

11. A method according to claim 3 in which, during the infusion step, the raisins are initially tumbled for a period of two to five minutes.

12. A method according to claim 11 in which the raisins are tumbled for one or more additional periods of from two to five minutes.

13. A method according to claim 11 in which the tumbling periods are about three minutes.

14. A method according to claim 11 where the infusion step takes place at a temperature of from about 90° F. to 110° F.

15. A method according to claim 11 wherein the amount of humectant absorbed into the raisins is from about 12 to about 16.5 weight percent.

16. A method according to claim 11 where the pressure during the infusion step is about 35 mm Hg.

17. A method for improving the softness retention characteristics of raisins which comprises the steps of: providing raisins with a moisture content of from about 20 to about 24%; spraying said raisins with glycerol at a temperature of from about 160° F. to 180° F. in an amount of from about 18 to about 22 percent based on the weight of the raisins; infusing the raisins with the humectant by reducing the pressure above the raisins to about 35 mm Hg for a period of from about 5 to about 8 hours, tumbling the raisins at the beginning of and at least once during the infusion step, and maintaining the raisins at the reduced pressure for sufficient time to enable the raisins to absorb glycerol to an amount of from about 12 to about 16.5 percent by weight; separating the raisins from any unused glycerol; and thereafter drying the raisins to a moisture content of from about 11 to about 15 percent by weight.

18. A method according to claim 17 in which raisins are first hydrated with water at a temperature of from about 170° to about 180° F. in order to provide raisins with the required moisture content of from about 20 to about 24%.

19. A method according to claim 18 in which the hydrating step requires a period of time of from about 60 to 90 seconds.

20. A method according to claim 17 in which the infusion step takes place over a period of from about 6 to 8 hours at a temperature of from about 90° to 110° F. and the tumbling takes place for periods of from two to five minutes.

21. A method according to claim 20 in which the infusion step takes place over a period of about six hours and the tumbling takes place for periods of about three minutes.

22. A method according to claim 17 in which the spraying and the infusion steps take place in a tumbler equipped with means for drawing a vacuum.

23. A method according to claim 22 wherein the drying step is performed at a temperature ranging from about 130° F. to 180° F. for a time period of about 60 to about 90 minutes.

24. A method according to claim 22 wherein the drying step is performed in a series of discrete successive drying stages of from about 165° to about 175° F., from about 135° to about 145° F., and from about 65° to about 75° F., for a total time period of about 60 to about 90 minutes.

25. A method according to claim 22 which comprises the additional step of coating the raisin product with a vegetable oil to provide a surface coating of from about 0.5 to about 1 weight percent.

\* \* \* \* \*